May 31, 1966 W. C. MANN 3,254,326

DECISION CIRCUIT

Filed Oct. 22, 1962 2 Sheets-Sheet 1

INVENTOR
William C. Mann

BY Ernest P. Klipfel
ATTORNEY

United States Patent Office 3,254,326
Patented May 31, 1966

3,254,326
DECISION CIRCUIT

William C. Mann, Laurel, Md., assignor to Westinghouse Electric Corporation, East Pittsburgh, Pa., a corporation of Pennsylvania Filed Oct. 22, 1962, Ser. No. 232,104
11 Claims. (Cl. 340—146.1)

This invention, in general, relates to signal restoring circuits, and in particular, to a decision circuit for use in a redundant logic system.

In the information handling field, computing systems are becoming faster, more complex, and more reduced in size. These desirable features enable a computer to handle more complex and sophisticated problems; however, significant increases in complexity make failures of the computing system more probable. In addition, repairs for the systems are extremely difficult, and in some cases impossible such as, for example, a computing system located in an orbiting satellite or space vehicle. Redundancy techniques are utilized to compensate for a lack of perfect reliability of such complex systems. One form of redundancy technique involves an exact duplication of an entire computing system and wherein if the first system fails the second system will be switched in to take over the computing function. This type of redundancy technique is quite costly and does not preclude the fact that failures may also occur in the second system. Other types of redundancy techniques utilize some type of decision element which receives a plurality of redundant signals from a previous stage and provides an output signal in accordance with the majority of its input signals. In this latter type circuit, without any failures, all of the input signals are identical and the output signal will be identical with the input signals. Should a number, less than the majority of input signals, fail, the element will still provide an output signal in accordance with the correct input signals; however, once the majority of correct input signals have failed the decision element will provide an incorrect output signal.

It is, therefore, one object of the present invention to provide a decision circuit for use in a redundant system which will provide a correct output signal even if all but one input signals have failed.

It is another object to provide a decision circuit for use in a redundant logic system which will provide a correct output signal in accordance with the changing of states of the input signal.

It is a further object of the invention to provide a decision circuit for use in a redundant logic system which will provide a correct output signal in accordance with a controlled predetermined number of correct input signals.

Another object is to provide a decision circuit for a redundant logic system which may detect the occurrence of a failed input signal.

Briefly, in accordance with the above objects, the decision circuit of the present invention includes means for receiving redundant information signals to provide a resultant signal proportional to the number of input signals received. As the input redundant signals change their values the resultant signal changes accordingly. The magnitude of change in value of the resultant signal is detected, and means are included for providing a first predetermined output signal if the change in the resultant signal is in a first predetermined direction, and a second predetermined output signal if the change in the resultant signal is in the opposite direction. Threshold means may be included such that aforementioned output signals will be provided only upon a predetermined change in value of the resultant signal.

The stated, and further objects of the present invention will become apparent upon a reading of the following detailed specification taken in conjunction with the drawings, in which.

Figure 1:
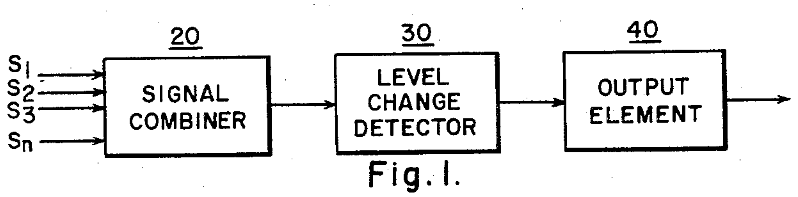
FIGURE 1 is a block diagram of one embodiment of the invention.

Referring now to FIG. 1, means are provided in the form of a signal combiner 20 to receive redundant input signals $S_1$, $S_2$, $S_3$, . . . $S_n$, and provides a resultant signal which is proportional to these input signals. In a computing system such as a digital computer, the signals $S_1$ through $S_n$ will generally be in binary form such that each of the signals will have one of two values. That is, each signal will have either a binary ONE value or a binary ZERO value. The signals $S_1$ to $S_n$ represent the redundant version of an output from a previous stage, and as such, each should assume the same value when switching from ONE to ZERO and vice versa. Often, however, one or more of the signals will fail, and in many circuits the probability that a failed signal will assume a steady state value is extremely high, that is, a failed signal will probably either remain a binary ONE or a binary ZERO. In order to detect any change in the resultant signal from the signal combiner 20, means are provided in the form of the level change detector 30 and the output element 40 for providing an output signal in accordance with any change, such that the output signal is a duplication of the correct input signals. To further explain this operation in more detail, reference should now be made to FIG. 2.

Figure 2:
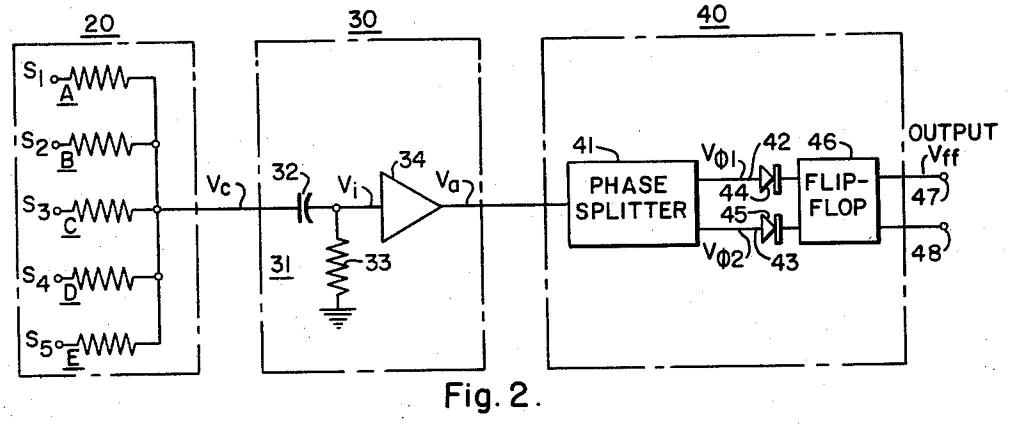
FIG. 2 shows, in more detail, the block diagram of FIG. 1.

In the FIG. 2, the signal combiner 20 is shown to be made up of a plurality of lines A to E each containing a resistance element for receiving a plurality of redundant input signals shown by way of example to be $S_1$ through $S_5$. The input signals are summed in the signal combiner 20 to provide a resultant voltage $V_c$ which is proportional to the sum of the signals appearing on each of the lines A to E. The level change detector 30 includes means for detecting the magnitude of any change, as distinguished from the magnitude of the resultant voltage $V_c$ which means may take the form of a differentiation circuit 31 having a capacitor 32 and a resistor 33. The output voltage $V_1$ of the differentiator 31, which is proportional to the rate of change of the input signal, may be fed to an amplifier 34 which will provide an output signal $V_a$ which is a reproduction of the input signal $V_1$ only if the input signal $V_1$ is above a certain threshold level which level may be adjusted at will. If the resultant voltage $V_c$ increases, the level change detector will provide a first control signal to the output element 40 and if the resultant voltage $V_c$ decreases, the level change detector 30 will provide a second control signal to the output element 40. In order to provide an output signal in accordance with the input signals thereto, the output element 40 may comprise a phase splitter 41 which is operable to receive the control voltages from the level change detector 30 to provide a signal $V_{o1}$ on line 42 and $V_{o2}$ on line 43. Diode 44 will pass any positive $V_{o1}$ signal to the flip-flop 46 and the diode 45 will pass any positive $V_{o2}$ signal to the flip-flop 46. The output signal $V_{ff}$ appearing on output lead 47 of the flip-flop device 46 will then be utilized as the output signal which may be fed to a next stage as is, or duplicated in a redundant version thereof. The flip-flop 46 may arbitrarily be chosen such that a positive signal passed by diode 44 will produce a ONE signal on output lead 47 and a positive signal passed by diode 45 will produce a ZERO signal on output lead 47. Output lead 48 will then provide the complement of the signal appearing on the output lead 47. The flip-flop 46 may also be arranged such that output signals will be produced only if the input control signals are above a predetermined value. In that case the aforementioned threshold level will be controllable by the flip-flop 46.

Figure 3:
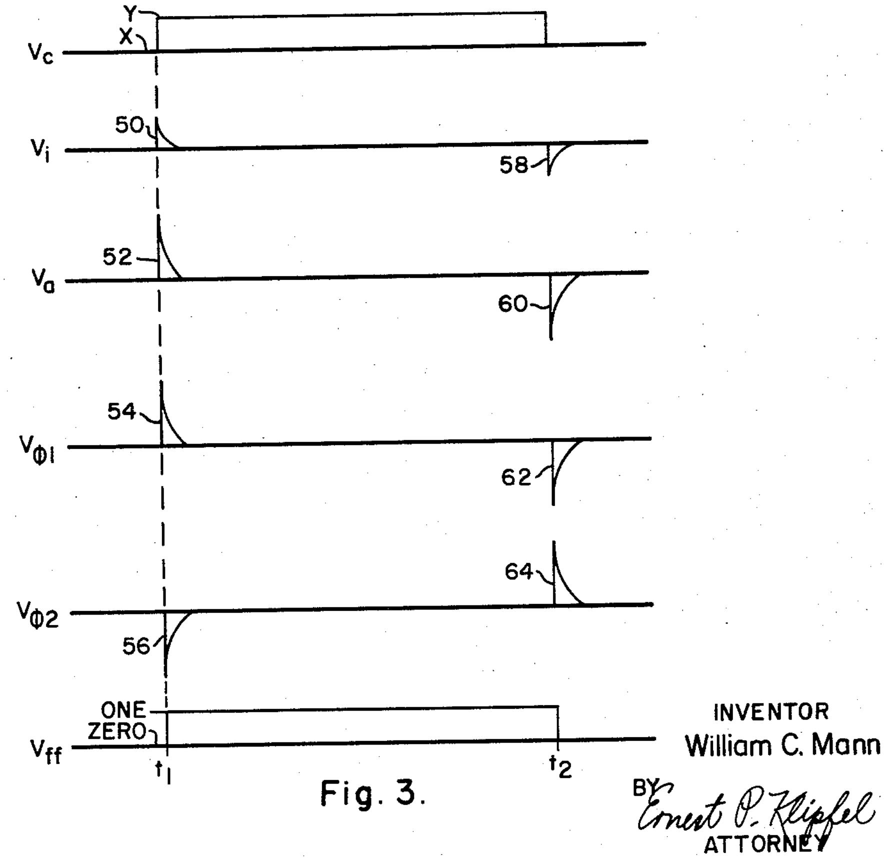
FIG. 3 are waveforms to aid in the understanding of the present invention.

Referring now to FIG. 3, there is shown waveforms to aid in the understanding of the operation of the circuit shown in FIG. 2. Assume, in the five input signal example shown, that all the signals are correct, and are at their ZERO value at the time just prior to $t_1$. The resultant voltage $V_c$ will then be at the predetermined level X. Assume at the time $t_1$, the signals $S_1$ to $S_5$ all change to their ONE value which will cause the resultant voltage $V_c$ to increase to another predetermined value, as designated by level Y. This change in resultant voltage from the X level to the Y level is presented to the differentiator 31 which will produce $V_i$ pulse 50, which will decay in a well known manner, determined by the value of the capacitor 32 and the resistor 33. The first control pulse 52 increasing in magnitude will be produced as a result of the amplification by amplifier 34 of the $V_i$ pulse 50. The phase splitter 41 accepts this control signal 52 to provide a reproduction 54 thereof on the output line 42 and a negative going pulse 56 on lead 43, in a well known manner. The diode 45 will block the negative going pulse 56 whereas diode 44 will pass the positive going pulse 54 to trigger the flip-flop 46 such that a ONE valued signal is provided on the output 47, and the output waveform $V_{ff}$, as seen in FIG. 3, switches from the ZERO level to the ONE level indicating that the redundant input signals have switched from their ZERO value to their ONE value. From $t_1$ to $t_2$ the redundant input signals all remain at their ONE value, the resultant voltage $V_c$ does not change in value and the output signal $V_{ff}$ remains at the ONE level. At time $t_2$ all of the redundant input signals switch to their ZERO value and the resultant voltage $V_c$ decreases to a second predetermined level X. This decrease is presented to the differentiator 31 which will then produce a negative going pulse 58 which is fed to the amplifier 34 to provide a negative going, or second control signal 60. The negative going pulse 60 presented to the phase splitter 41 will appear on line 42 as a negative going pulse 62 and on line 43 as a positive going pulse 64. Diode 44 will block the negative going pulse 62 whereas diode 45 will pass the positive going pulse 64 to trigger the flip-flop such that a ZERO valued signal will be provided on output lead 47 and the output signal $V_{ff}$ in FIG. 3 is shown to assume its ZERO level, thus providing an output signal in accordance with the redundant input signals. In many instances one or more of the input redundant signals may fail, and the operation of the circuit of FIG. 2 in that case may be best explained by reference to FIG. 4.

Figure 4:
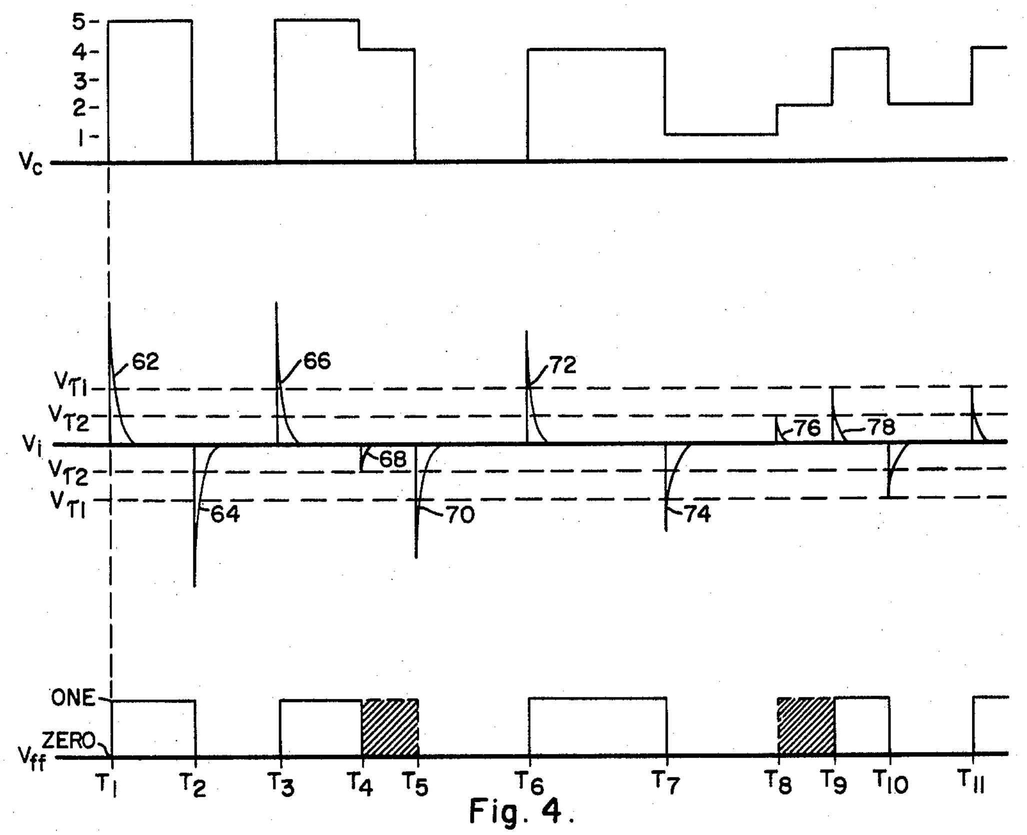
FIG. 4 shows waveforms explaining the operation of the present invention.

In FIG. 4, assume that just prior to switching time $T_1$ all of the redundant input signals $S_1$ through $S_5$ are correct and are at their ZERO value. Assume further that at time $T_1$, the input signals all switch to their ONE value. The resultant voltage $V_c$ has a magnitude proportional to the sum of the input voltages and the magnitude in FIG. 4 at time $T_1$ is arbitrarily shown as 5 units. The switching at time $T_1$ produces the $V_i$ pulse 62 which will cause the output signal $V_{ff}$ to assume a ONE value, as previously explained. For purposes of this example assume that the threshold level is at $V_{\tau 1}$ as shown on the $V_i$ scale of FIG. 4. From $T_1$ to $T_2$ all of the input signals remain at their ONE value and the output signal $V_{ff}$ continues to provide a ONE value. At time $T_2$ all of the redundant input signals assume their ZERO value, the resultant voltage $V_c$ decreases, producing the negative going $V_i$ pulse 64 which causes the flip-flop 46 to provide a ZERO value output signal. At time $T_3$ the signals again assume their ONE value, the resultant voltage $V_c$ increases, producing positive going $V_i$ pulse 66 which causes the flip-flop 46 to provide a ONE value output signal. Assume that from $T_3$ to $T_5$, a correct input signal has a ONE value. Assume further that at $T_4$ signal $S_1$ fails and reverts to a steady state ZERO value which shows up on the resultant voltage curve $V_c$ as a decrease in magnitude of 1 unit. This decrease in the resultant voltage $V_c$ produces a negative going $V_i$ pulse 68 which is below the chosen threshold value $V_{\tau 1}$, the state of the flip-flop will not be changed and it will continue to provide a ONE value output signal as shown from time $T_3$ to $T_5$ in curve $V_{ff}$. It may be seen, therefore, that with the threshold chosen as $V_{\tau 1}$ the correct input signals remaining, continue to provide a correct output signal. At time $T_5$ the remaining lines switch to their ZERO value, the decrease of the resultant voltage $V_c$ producing negative going $V_i$ pulse 70 which causes the flip-flop 46 to provide a ZERO value output signal. Since the $S_1$ signal has failed to steady state ZERO value the next transition at time $T_6$ of the four remaining lines will produce a resultant voltage $V_c$ having a magnitude of 4 units. The increasing resultant voltage $V_c$ producing positive going $V_i$ pulse 72 to cause the flip-flop device 46 to again provide a ONE value output signal. Assume that at the switching time $T_7$ another signal fails, for example, $S_3$, such that it remains a steady state ONE value. In that instance the resultant voltage $V_c$ will decrease 3 units to the 1 unit level of the $V_c$ curve to produce a negative going $V_i$ pulse 74 which causes the flip-flop device 46 to provide a ZERO value output signal. From $T_7$ to $T_8$ the correct remaining input signals are providing ZEROS while the failed signal $S_3$ continues to provide a ONE value signal, the resultant voltage $V_c$ from $T_7$ to $T_8$ does not change and the output of the flip-flop 46 is held at its ZERO value output. At time $T_8$ assume, for example, signal $S_4$ fails and assumes a steady state ONE value which will cause the resultant voltage $V_c$ to increase thus producing a positive going $V_i$ pulse 76 which is below the threshold $V_{\tau 1}$ and consequently, will not change the flip-flop output which remains at its ZERO value until $T_9$ when the remaining unfailed signals $S_2$ and $S_5$ assume their ONE value thus increasing the resultant voltage $V_c$ by 2 units causing positive going pulse 78 which is of sufficient magnitude to cause the flip-flop device 46 to provide a ONE value output signal. It may be seen that from $T_7$ to $T_9$ two failures occurred, yet the output signal $V_{ff}$ was a ZERO value in accordance with the correct ZERO value input signals. From $T_9$ to $T_{10}$ the correct input signals are ONES and the output signal provided is a ONE, at time $T_{10}$ the two remaining signals switch to their ZERO value causing a decrease in the resultant voltage $V_c$ and a ZERO value output signal. At $T_{11}$ the correct input signals switch to a ONE value and the output signal $V_{ff}$ produced will assume a ONE value. In the example just described, a correct output signal will be provided in accordance with at least two remaining correct input signals. In order to provide a correct output signal with only one correct input signal remaining, the level change detector 30, or the output element 40 for example, may be adjusted to a different threshold level, such as $V_{\tau 2}$.

With the threshold level set at $V_{\tau 2}$ assume that at time $T_1$ all the input signals are correct and switch from their ZERO value to their ONE value thus causing an increase, or change in the resultant voltage $V_c$ of 5 units as was previously described. The output signal provided will then have a ONE value. The operation will continue in the same manner as the previous example up until time $T_4$ when the signal $S_1$ failed and assumed its ZERO value. At time $T_4$ the resultant voltage $V_c$ decreases in magnitude by 1 unit producing the $V_i$ pulse 68 which, with the threshold level now decreased to $V_{\tau 2}$, will cause the output signal $V_{ff}$ to switch to its ZERO value. At time $T_5$ when the remaining input signals switch to their ZERO value the negative going pulse 70 will not change the output signal since it is already at its ZERO value. It may, therefore, be seen that an erroneous output signal $V_{ff}$ is provided as shown by the shaded portion from the time $T_4$ to $T_5$, which is correct after $T_5$. Operation until time $T_8$ is the same as that previously described. At time $T_8$ it will be remembered, signal $S_4$ having a ZERO value failed and assumed a steady state ONE value, the failure causing an increase of 1 unit of the resultant voltage $V_c$ which produces the positive going $V_i$ pulse 76. In this instance since the threshold level is set at $V_{r2}$ the positive going pulse 76 will cause the output to provide a ONE value signal. At time $T_9$ the remaining correct input signal assume their ONE value, producing an increase of 2 units in the resultant voltage $V_c$ thereby providing the positive going $V_i$ pulse 78 which has no effect upon the flip-flop 46 since it is already providing a ONE value output signal. It may, therefore, be seen that during the shaded portion from $T_8$ to $T_9$ an incorrect output is given. The switching of states of the output signal $V_{ff}$ is shown, in FIGS. 3 and 4, to occur at the same time as the switching of states of the input signals (as represented by $V_c$). It is to be understood, however, that there may be some time delay inherent in the equipment used which will, in actuality, cause the output signal $V_{ff}$ to be slightly displaced in time from the resultant voltage $V_c$. Additionally, in actual use, the input signals may switch values at a constant frequency. In the example described herein the pulse (or no pulse) durations were chosen at random.

The circuit of the present invention, therefore, is able to cancel errors to provide a correct output signal in accordance with a predetermined number of correct input signals which may be less than the majority. When the circuit is arranged such that the predetermined number is one remaining correct input signal, it may be seen that, as in the example given, there might possibly be short periods in the cycle wherein the output signal will be incorrect, and in the example given is the time period from $T_4$ to $T_5$, and from $T_8$ to $T_9$. There may be instances in the operation of the present invention wherein there will be no incorrect output signals provided, and is dependent upon the type and time of failure of the particular input signal or signals. As an added safety factor, circuitry may be included to indicate when and if an incorrect output has been provided. To this end, reference should now be made to FIG. 5.

Figure 5:
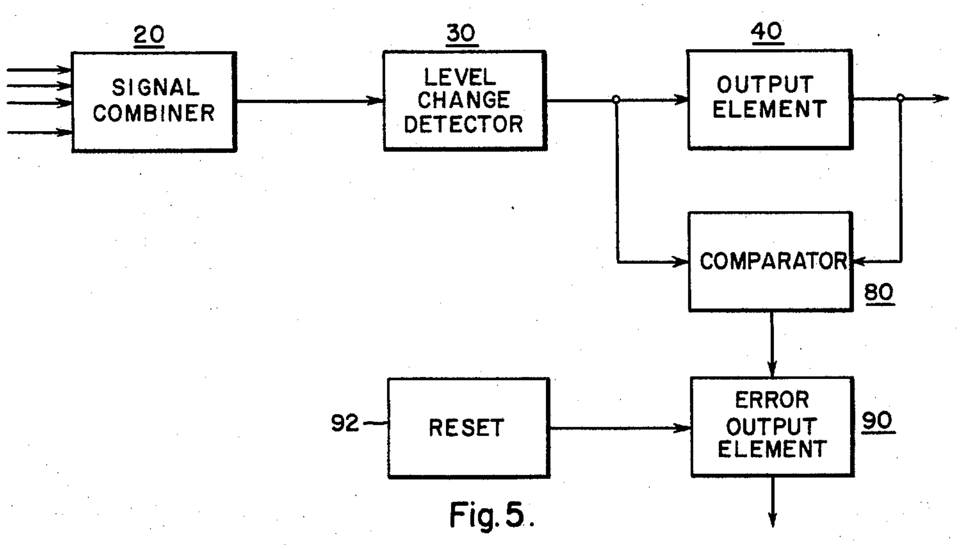
FIG. 5 is a block diagram of another embodiment of the present invention.

In FIG. 5 the basic decisions circuit is shown, and includes the signal combiner 20, the level change detector 30, and output element 40. In addition, there is provided means for determining whether the output element 40 has provided an incorrect output signal and which means may take the form of comparator 80 and error output element 90 which may include reset means 92. The comparator 80 continuously compares the state of the output element with a control signal which may be obtained from the level change detector 30 and if this control signal instructs the output element 40 to change the output signal to the present state of the output signal, then the comparator 80 produces a voltage pulse or signal which indicates that an error may have occurred. For example, and with reference to FIG. 4, with the threshold level chosen such that a correct output signal will be provided when only one correct input signal remains, at time $T_4$ when the negative going $V_i$ pulse 68 was produced it caused the output element to provide a ZERO value output signal. The following negative going $V_i$ pulse 70 also instructs the output element 40 to provide a ZERO value output signal, however, in this instance the output element 40 is already providing that ZERO value output signal. The ZERO value output signal fed into the comparator 80 in combination with a control signal produced by the negative going $V_i$ pulse 70 causes the comparator 80 to provide an output pulse to the error output element 90 which in its simplest form may be a flip-flop which will then provide a ONE value output error signal. At time $T_6$ the positive going $V_i$ pulse 72 tells the output element 40 to provide a ONE value output signal. Since the output element 40 was providing a ZERO value output signal it will change to a ONE value output signal and according to the mode of operation of the comparator, as previously explained, a voltage pulse or signal will not be produced and the error output element 90 will provide a ZERO value error signal indicating that the error no longer exists. Alternatively, the error output element 90 may be made to function such that an error signal will continue to be provided, until reset by reset means 92. Again, at time $T_8$ and $T_9$ the sequential positive going $V_i$ pulses 76 and 78 will cause the comparator to again produce a voltage pulse or signal which will cause the error output element 90 to indicate an error has occurred after which normal operation is resumed at time $T_{10}$. The error signal provided by the error output element 90 allows for incorrect results to be noted and corrected by auxiliary processing equipment, not shown.

Although one embodiment of the present invention has been described with a certain degree of particularity, it is to be understood that modifications may be made thereto without departing from the spirit and scope of the invention. For example, although an embodiment of the invention was herein described with respect to an electrical system, the principles of operation are equally applicable to other type systems such as pneumatic or fluid circuits.

What is claimed is:

1. A decision circuit for use in redundant logic systems, comprising: signal combining means for receiving redundant information signals and operable to provide a resultant signal proportional to said information signals; detecting means for detecting any change in magnitude of said resultant signal toward a first or second predetermined value, said detecting means being responsive to said change in magnitude, as distinguished from the magnitude for producing a first control signal when said resultant signal goes toward said first predetermined value and a second control signal when said resultant signal goes toward said second predetermined value; and output means responsive to any output signal from said detecting means for providing an output signal having said first predetermined value upon receipt of said first control signal, and an output signal having said second predetermined value upon receipt of said second control signal.

2. A decision circuit for use in redundant logic systems, comprising: signal combining means for providing a resultant voltage in response to the changing of states of a plurality of redundant input signals, said signals when in agreement, all having either a first or a second value, and means responsive to the difference in magnitude of said resultant signal before a change and after a change, as distinguished from the magnitude after the change for providing a first value output signal if said change is in a first predetermined direction, and a second value output signal if said change is in a second predetermined direction.

3. A decision circuit for use in redundant logic systems, comprising: signal combining means for receiving input signals to provide a resultant signal proportional to said input signals, each said input signal having either a first value or a second value; detecting means for detecting the magnitude of change of said resultant signal as said input signals change between said values, including threshold means for providing a first control signal when a predetermined number of said input signals switch to said first value and a second control signal when a predetermined number of said input signals switch to said second value; and output means connected to said detector means for providing an output signal having said first value upon receipt of said first control signal, and an output signal having said second value upon receipt of said second control signal.

4. A decision circuit for use in redundant logic systems, comprising: signal combining means for receiving a plurality of correct input signals, each signal having either a ONE or ZERO value, said signal combining means providing a resultant voltage proportional to the sum of said input signals whereby a switching between values, or a failure of any of said correct signals causes said resultant voltage to either increase, decrease or remain the same, depending upon the value of the correct input signal before switching or before failure; detector means responsive, when said resultant voltage increases, to the magnitude of said increase for providing a first control signal, and responsive, when said resultant voltage decreases, to the magnitude of said decrease for providing a second control signal; and output means responsive to said detecting means to provide a ONE value output signal upon receipt of said first control signal and a ZERO output signal upon receipt of said second control signal.

5. A decision circuit for use in redundant logic systems, comprising: signal combining means for receiving similar input signals each having either a ONE or a ZERO value, said signal combining means providing a resultant voltage proportional to said input signals, the occurrence of a dissimilar input signal causing said resultant voltage to either increase or decrease; detecting means for detecting the difference in magnitude of said resultant voltage before and after the switching of said input signals between said ONE and ZERO values, or said occurrence of a dissimilar input signal, said detecting means including threshold means for providing a first control signal upon a predetermined change in a first direction of said resultant voltage and a second control signal upon a predetermined change in an opposite direction; and output means responsive to said first and second control signals for providing either a ONE or ZERO output signal.

6. An error cancelling circuit for use in redundant logic systems, comprising: signal combining means for providing a resultant signal in response to a plurality of redundant input signals, said signals when in agreement, all having either a first or a second value; means responsive to a predetermined rate of change of said resultant signal for providing a first value output signal if said change is in a first predetermined direction and above a predetermined threshold, and a second value output signal if said change is in a second predetermined direction and above a predetermined threshold 7. An error cancelling decision circuit for use in redundant logic systems, comprising: signal combining means for receiving a plurality of correct input signals, each signal having either a ONE or ZERO value, said signal combining means providing a resultant voltage proportional to the sum of said input signals whereby a switching between values, or a failure of any of said correct signals causes said resultant voltage to either increase, decrease or remain the same, depending upon the value of the correct input signal before switching or before failure; detector means responsive to the difference in magnitude of said resultant voltage before and after a change for providing a first control signal upon said increase and a second control signal upon said decrease; output means responsive to said detector means to provide a ONE value output signal upon receipt of said first control signal and a ZERO output signal upon receipt of said second control signal; and comparison means responsive to the control signals provided by said detector means, and output signals provided by said output means for indicating whether an incorrect output signal is being provided.

8. A decision circuit for use in redundant logic systems, comprising: signal combining means for receiving similar input signals each having either a ONE or a ZERO value, said signal combining means providing a resultant voltage proportional to said input signals whereby the occurrence of a dissimilar input signal causes said resultant voltage to either increase or decrease; detecting means for detecting any change in said resultant voltage brought about by either said input signals switching between said ONE and ZERO values or said occurrence of a dissimilar input signal to provide a first control signal upon a predetermined change in a first direction of said resultant voltage and a second control signal upon a predetermined change in an opposite direction; output means responsive to said first and second control signals for providing either a ONE or ZERO output signal, if said first and second control signals are above a predetermined threshold; and comparison means responsive to any output signal and any control signal for providing an error signal upon the occurrence of sequential first control or sequential second control signals.

9. A decision circuit for use in redundant logic systems, comprising: signal combining means for providing a resultant voltage in response to a plurality of redundant input signals, said signals when in agreement, all having either a first or a second value, any failed signal assuming either a first or second value; means responsive to a predetermined magnitude of change in said resultant voltage for providing a first value output signal if said change is in a first predetermined direction, and a second value output signal if said change is in a second predetermined direction; and error detecting means for providing an error signal if successive changes of said resultant voltage are in the same direction.

10. A decision circuit for use in redundant logic systems comprising: signal combining means for receiving a plurality of redundant input signals, each signal having a ONE or ZERO value and subject to failure, to provide a resultant signal proportional to said input signals; means responsive to said resultant signal for providing a first pulse signal if said resultant signal increases due to one or more input signals increasing, and providing a second pulse signal if said resultant signal decreases due to one or more input signals decreasing, irrespective of the number of failed input signals; and output means for providing predetermined output signals in response to said first and second pulse signals.

11. A decision circuit for use in redundant logic systems comprising: signal combining means for receiving a plurality of redundant input signals each having a ONE or ZERO value, to provide a resultant signal proportional to said input signals; a differentiation circuit connected to said signal combining means for providing a positive pulse if said resultant signal increases in value and for providing a negative pulse if said resultant signal decreases in value, said positive and negative pulses being proportional to said increase or decrease; and means including a bistable device responsive to said positive and negative pulses for providing a ONE output signal when said pulse is positive and a ZERO output signal when said pulse is negative.

References Cited by the Examiner

UNITED STATES PATENTS

| | | | |
|---|---|---|---|
| 2,603,746 | 7/1952 | Burkhart et al. | 328—150 |
| 2,923,821 | 2/1960 | Wilson | 328—115 |
| 3,105,955 | 10/1963 | Mauchly | 340—146.1 |

OTHER REFERENCES

Pages 241–263, page 249 relied on, March 20–23, 1961, "Systematically Introduced Redundancy in Logical Systems," Mann, 1961, IRE International Convention Record, Part 2.

Pages 271–276, "Tunnel Diode Threshold Logic," Sarrafian, 1961, IRE International Convention Report, Part 2, March 20–23, 1961.

ROBERT C. BAILEY, *Primary Examiner.*

MALCOLM A. MORRISON, *Examiner.*